(12) United States Patent
Hsu et al.

(10) Patent No.: US 10,746,940 B2
(45) Date of Patent: Aug. 18, 2020

(54) FIBER OPTIC ADAPTOR ASSEMBLY HAVING INTERLOCKING MECHANISM

(71) Applicants: Gloriole Electroptic Technology Corp., Kaohsiung (TW); SHEN ZHEN WONDERWIN TECHNOLOGY CO., LTD., Shenzhen, Guangdong Province (CN)

(72) Inventors: Shu-Hui Hsu, Kaohsiung (TW); Yen-Chang Lee, Kaohsiung (TW)

(73) Assignees: GLORIOLE ELECTROPTIC TECHNOLOGY CORP., Kaohsiung (TW); SHEN ZHEN WONDERWIN TECHNOLOGY CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/435,912

(22) Filed: Jun. 10, 2019

(65) Prior Publication Data
US 2020/0003966 A1    Jan. 2, 2020

(30) Foreign Application Priority Data
Jun. 29, 2018  (TW) .............................. 107208802 U

(51) Int. Cl.
*G02B 6/38*  (2006.01)

(52) U.S. Cl.
CPC ......... *G02B 6/3825* (2013.01); *G02B 6/3897* (2013.01)

(58) Field of Classification Search
None
See application file for complete search history.

(56) References Cited

U.S. PATENT DOCUMENTS

| | | | | |
|---|---|---|---|---|
| 4,425,018 A * | 1/1984 | Stenz | .................. | H01R 9/2408 439/716 |
| 6,375,517 B1 * | 4/2002 | Okabe | .................. | H01R 13/514 439/594 |
| 6,932,514 B2 * | 8/2005 | Anderson | ............ | G02B 6/3825 385/56 |
| 7,156,672 B2 * | 1/2007 | Fromm | ................ | H01R 13/514 439/101 |
| 9,316,794 B2 * | 4/2016 | Chen | ..................... | G02B 6/3869 |
| 9,599,779 B2 * | 3/2017 | Lee | ....................... | G02B 6/3897 |
| 10,374,352 B2 * | 8/2019 | Willems | ............... | H01R 13/514 |
| 2011/0206324 A1 * | 8/2011 | Childers | .............. | G02B 6/3825 385/55 |
| 2014/0334780 A1 * | 11/2014 | Nguyen | ............... | G02B 6/3897 385/77 |

(Continued)

*Primary Examiner* — Michelle R Connelly
(74) *Attorney, Agent, or Firm* — Muncy, Geissler, Olds & Lowe, P.C.

(57) ABSTRACT

A fiber optic adaptor assembly includes a main body that includes two parallel and spaced-apart main base walls, two lateral walls, three spaced-apart connecting grooves, and two spaced-apart connecting tongues. Each of the lateral walls is connected between the main base walls. The main base walls and the lateral walls cooperatively define an installation hole thereamong. The connecting grooves are formed in one of the lateral walls, and the connecting tongues protrude from the other one of the lateral walls. The connecting tongues are adapted to separably and respectively engage any two adjacent ones of the connecting grooves of another one of the main body.

3 Claims, 7 Drawing Sheets

(56) References Cited

U.S. PATENT DOCUMENTS

| | | | |
|---|---|---|---|
| 2015/0205060 A1* | 7/2015 | Chen | G02B 6/3869 385/89 |
| 2016/0011383 A1* | 1/2016 | Lee | G02B 6/3897 385/75 |
| 2016/0356966 A1* | 12/2016 | Lin | G02B 6/3879 |

* cited by examiner

FIBER OPTIC ADAPTOR ASSEMBLY HAVING INTERLOCKING MECHANISM

CROSS-REFERENCE TO RELATED APPLICATION

This application claims priority of Taiwanese Patent Application No. 107208802, filed on Jun. 29, 2018.

FIELD

The disclosure relates to an adaptor assembly, and more particularly to a fiber optic adaptor assembly.

BACKGROUND

Referring to FIG. 1, conventionally, a plurality of fiber optic adaptors 3 are connected to an optical fiber distribution hub 4. The optical fiber distribution hub has a box body 41, and a faceplate 42 connected to the box body 41 and formed with a coupling opening 422 and a plurality of insertion holes 421 extending into the box body 41. The fiber optic adaptors 3 are inserted into the coupling opening 422 and the insertion holes 421.

In order to provide densified and complex fiber optic network arrangements for satisfying a need to transmit massive information, it is necessary to simultaneously use different types of fiber optic adaptors 3 during constructing distribution networks of optical fibers. As such, the fiber optic adaptors 3 come in designated sizes to fit through the insertion holes 421 and the coupling opening 422 of the faceplate 42 to properly connect optical fiber cables (not shown) thereto. In addition, since the optical fiber cables may come in various lengths, each of the fiber optic adaptors 3 would have to extend into the box body 41 at a specific depth to be paired with a respective one of the optical fiber cables.

However, manufacture of the abovementioned fiber optic adaptors 3 would require manufacturing molds of different sizes as well, heightening the production cost. A flexible, assembly-based design to the fiber optic adaptor assembly is highly considered to resolve the drawback of the molded, single-piece design.

SUMMARY

Therefore, an object of the disclosure is to provide a fiber optic adaptor assembly that can alleviate the drawback of the prior art.

According to the disclosure, the fiber optic adaptor assembly includes a main body that includes two parallel and spaced-apart main base walls, two lateral walls, three spaced-apart connecting grooves, and two spaced-apart connecting tongues. Each of the lateral walls is connected between the main base walls. The main base walls and the lateral walls cooperatively define an installation hole thereamong. The connecting grooves are formed in one of the lateral walls, and the connecting tongues protrude from the other one of the lateral walls. The connecting tongues are adapted to separably and respectively engage any two adjacent ones of the connecting grooves of another one of the main body.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
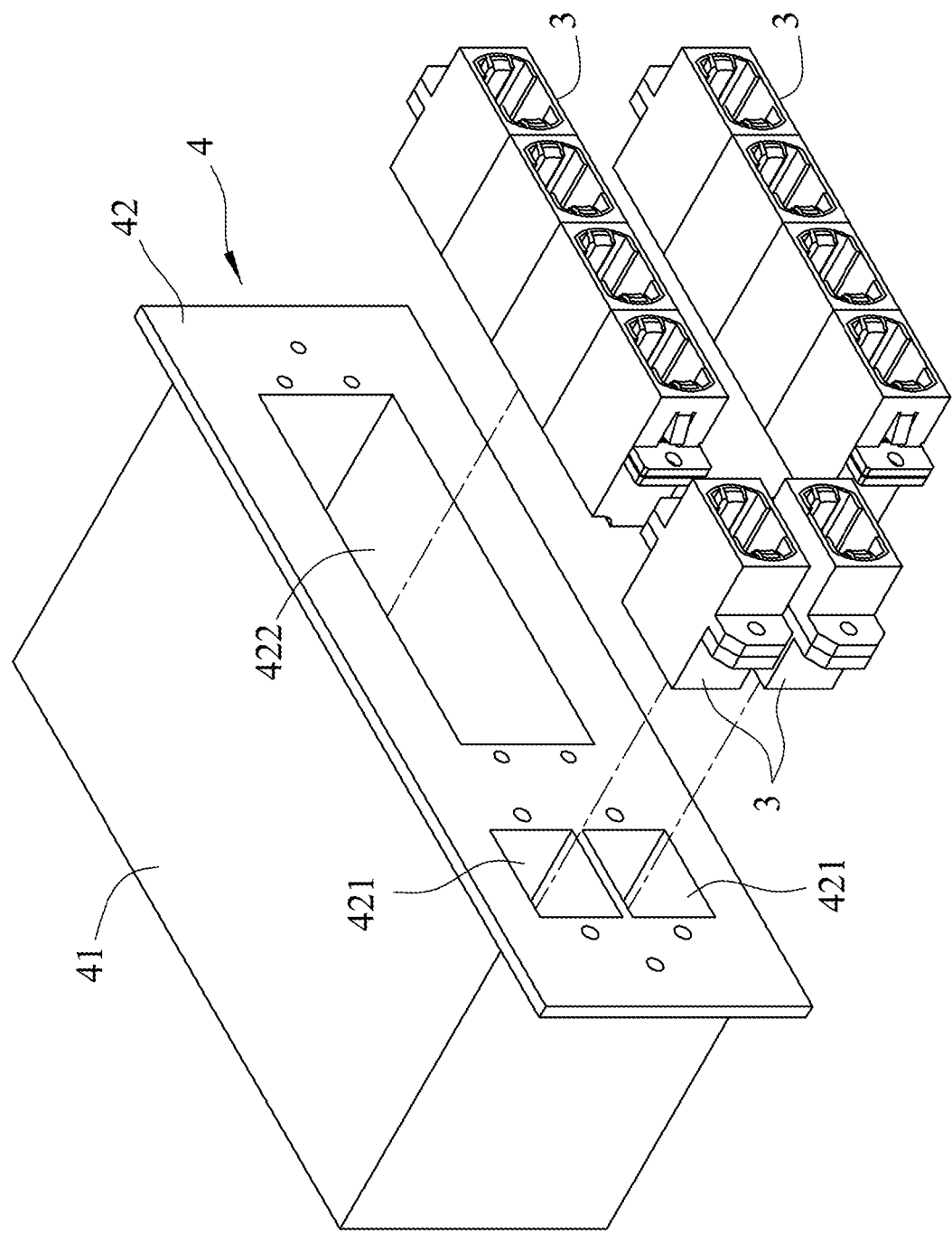
FIG. 1 is an exploded perspective view of a conventional fiber optic adaptor assembly.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
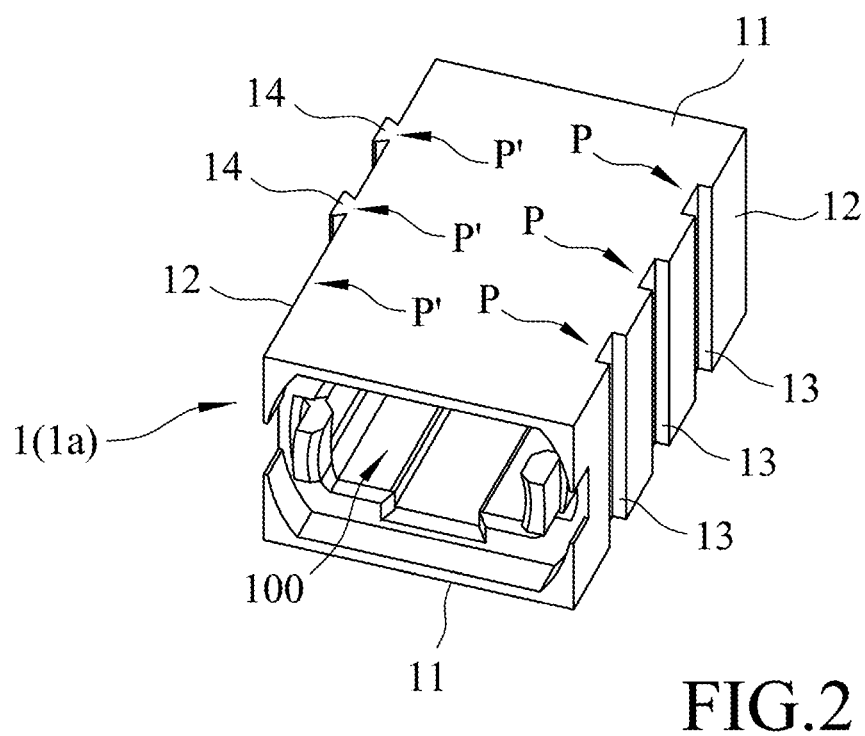
FIG. 2 is a perspective view of a main body of a first embodiment of fiber optic adaptor assembly according to the disclosure.
Figure 3:
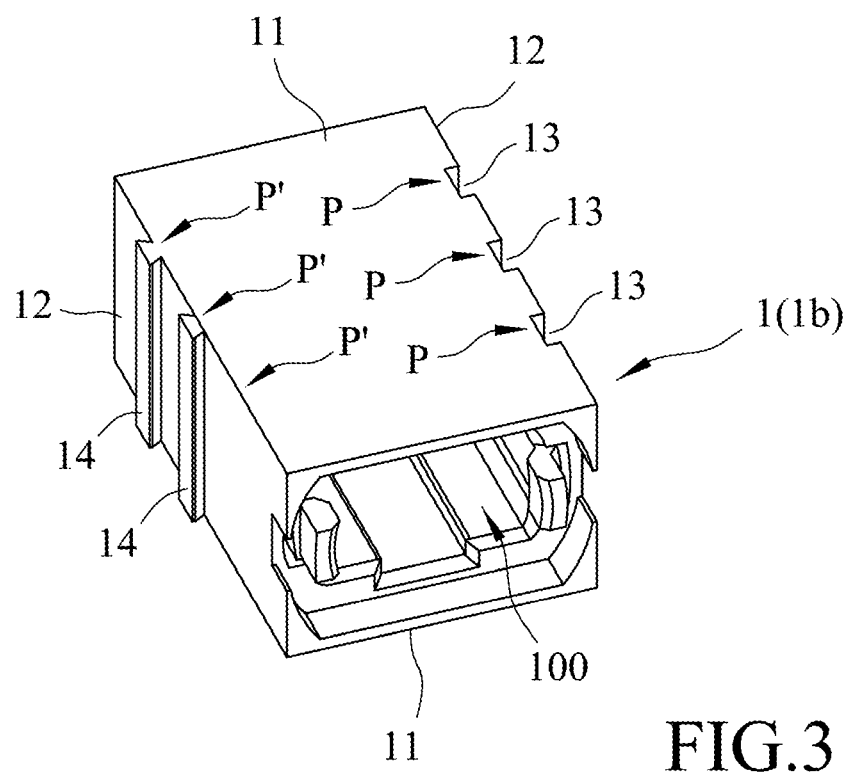
FIG. 3 is another perspective view of the main body of first embodiment.

Referring to FIGS. 2 and 3, a first embodiment of a fiber optic adaptor assembly according to the disclosure has a plurality of main bodies 1 (only one is shown). The main body 1 includes two parallel and spaced-apart main base walls 11, two lateral walls 12, each of which is connected between the main base walls 11, three spaced-apart connecting grooves 13 that are formed in one of the lateral walls 12, and two spaced-apart connecting tongues 14 that protrude from the other one of the lateral walls 12. The main base walls 11 and the lateral walls 12 cooperatively define an installation hole 100 thereamong.

Each of the lateral walls 12 defines three spaced-apart reference points (P, P') disposed thereon. The connecting grooves 13 are respectively aligned to the reference points (P) on the one of the lateral walls 12, and the connecting tongues 14 are respectively aligned to two adjacent ones of the reference points (P') on the other one of the lateral walls 12 tinder the abovementioned orientation, the connecting tongues 14 are adapted to separably and respectively engage any two adjacent ones of the connecting grooves 13 of another one of the main body 1. In this embodiment, each of the connecting grooves 13 and the connecting tongues 14 is elongated to extend from one of the base walls 11 to the other one of the base walls 11, but is not restricted to such. The main bodies 1 of the first embodiment include first and second configurations, as denoted by 1a and 1b in FIG. 4. The differences between the two configurations reside in the locations of connecting tongues 14, as shown in FIGS. 2 and 3.

Figure 4:
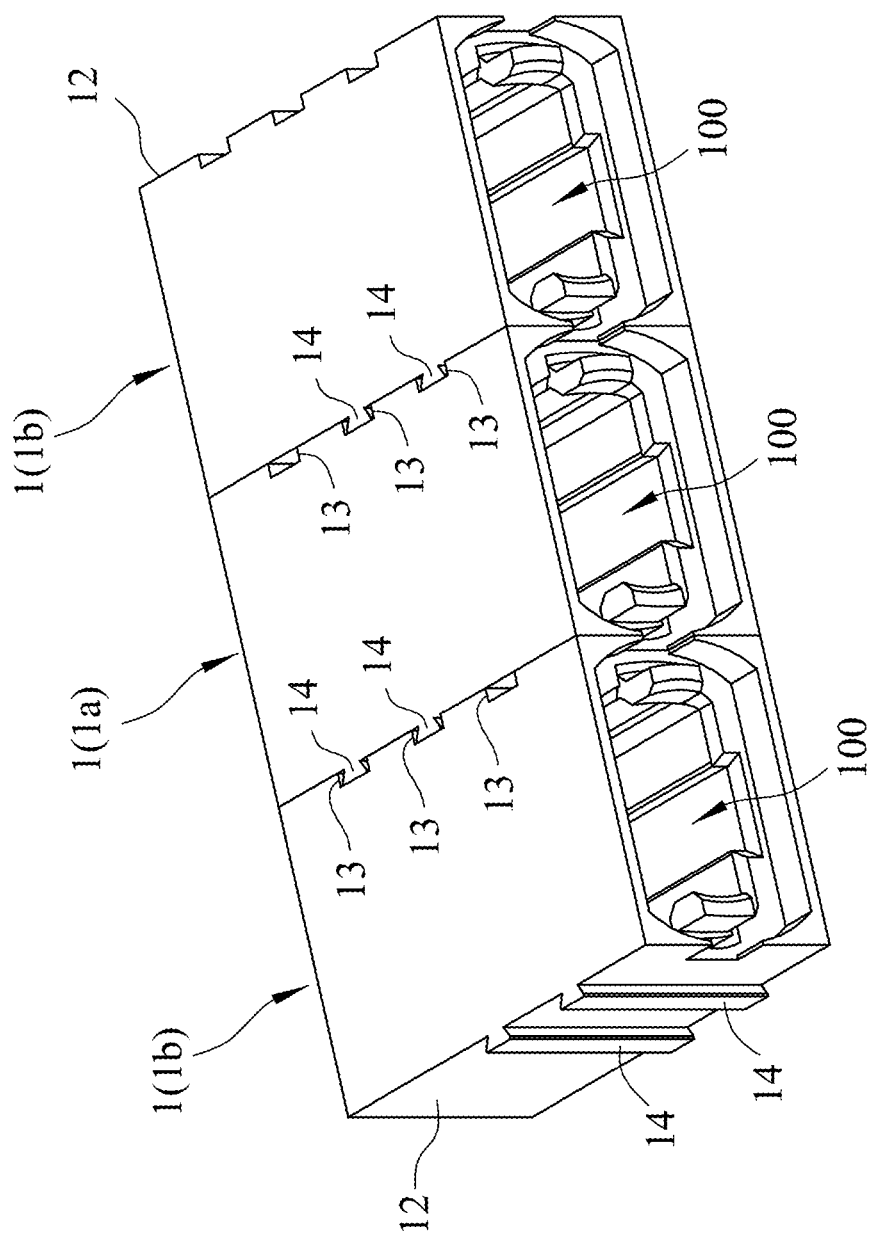
FIG. 4 is yet another perspective view of the first embodiment, illustrating an assembly of the main bodies being peripherally aligned.

Referring to FIG. 4, when optic fiber cables (not shown) are evenly aligned, the main bodies 1 of the fiber optic adaptor assembly may be peripherally aligned and be coupled together to complement the cables. To do so, for each of the main bodies 1, an inner one of the connecting tongues 14 (the one nearest to a center of the lateral walls 12) engages the middle one of the connecting grooves 13 of an adjacent one of the main bodies 1, and an outer one of the connecting tongues 14 engages either one of the remaining connecting grooves 13 of the adjacent one of the main bodies 1.

Figure 5:
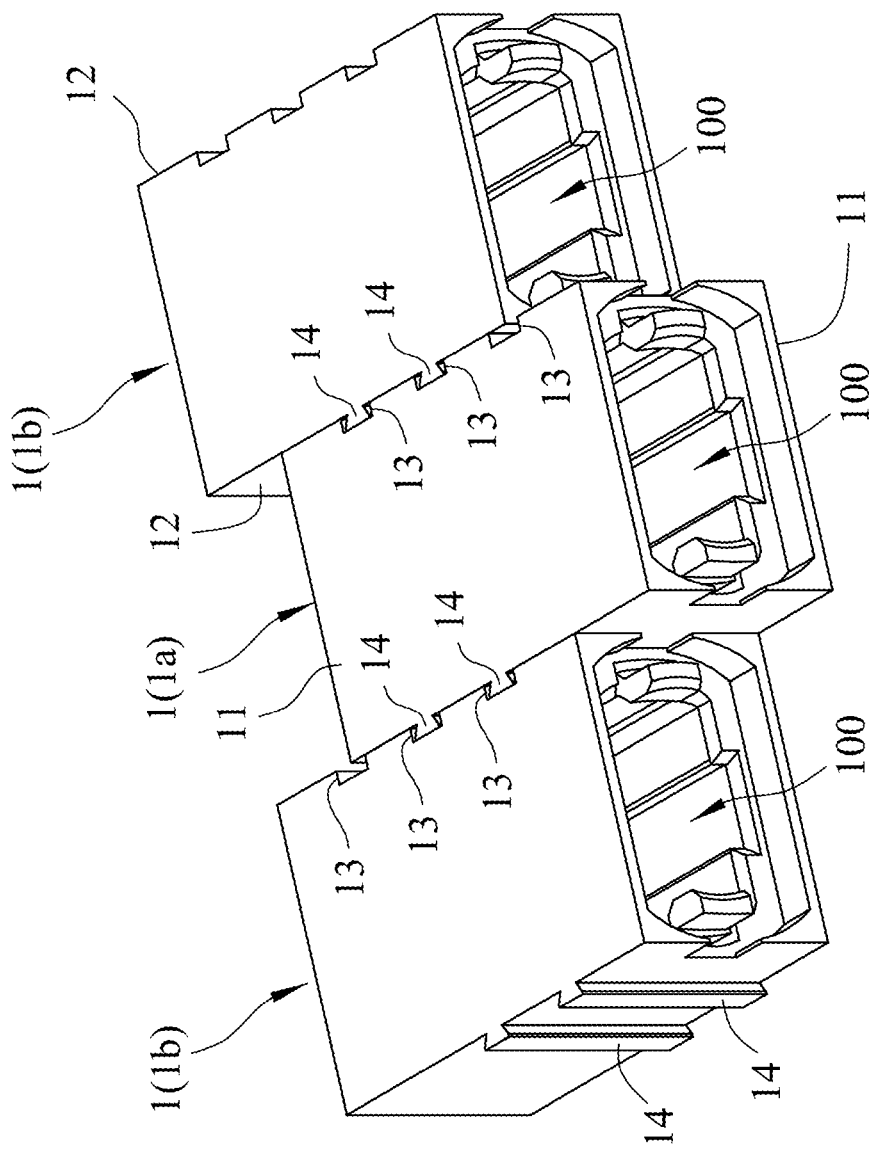
FIG. 5 is a view similar to FIG. 5, illustrating the assembly of the main bodies being peripherally misaligned.

On the other hand, when optic fiber cables are not evenly aligned, the main bodies 1 of the fiber optic adaptor assembly may be peripherally misaligned to complement the cables without being separated. For example, referring to FIG. 5, when only a primary main body 1a has to be misaligned relative to secondary main bodies 1b, the primary main body 1a is moved relative to the secondary main bodies 1b to engage the secondary main bodies 1b differently. Specifically, the outer one of the connecting tongues 14 of the primary main body 1a engages the middle one of the connecting grooves 13 of an adjacent one of the secondary main bodies 1b, and the inner one of the connecting tongue 14 of the primary main body 1a engages one of the remaining connecting grooves 13 of the adjacent secondary main body 1b. Likewise, the middle one of the connecting grooves 13 of the primary main body 1a is engaged to the outer one of the connecting tongues 14 of the other adjacent one of the secondary main bodies 1b, and one of the remaining connecting grooves 13 of the primary main body 1a proximate to the outer one of the connecting tongues 14 of the primary main body 1a is engaged to the inner one of the connecting tongues 14 of the other adjacent one of the secondary main bodies 1b, such that both of the adjacent secondary main bodies 1b remain aligned with each other. It should be noted that the main bodies 1 of the fiber optic adaptor assembly may be further realigned in other combinations of patterns and is not restricted to the abovementioned examples.

Figure 6:
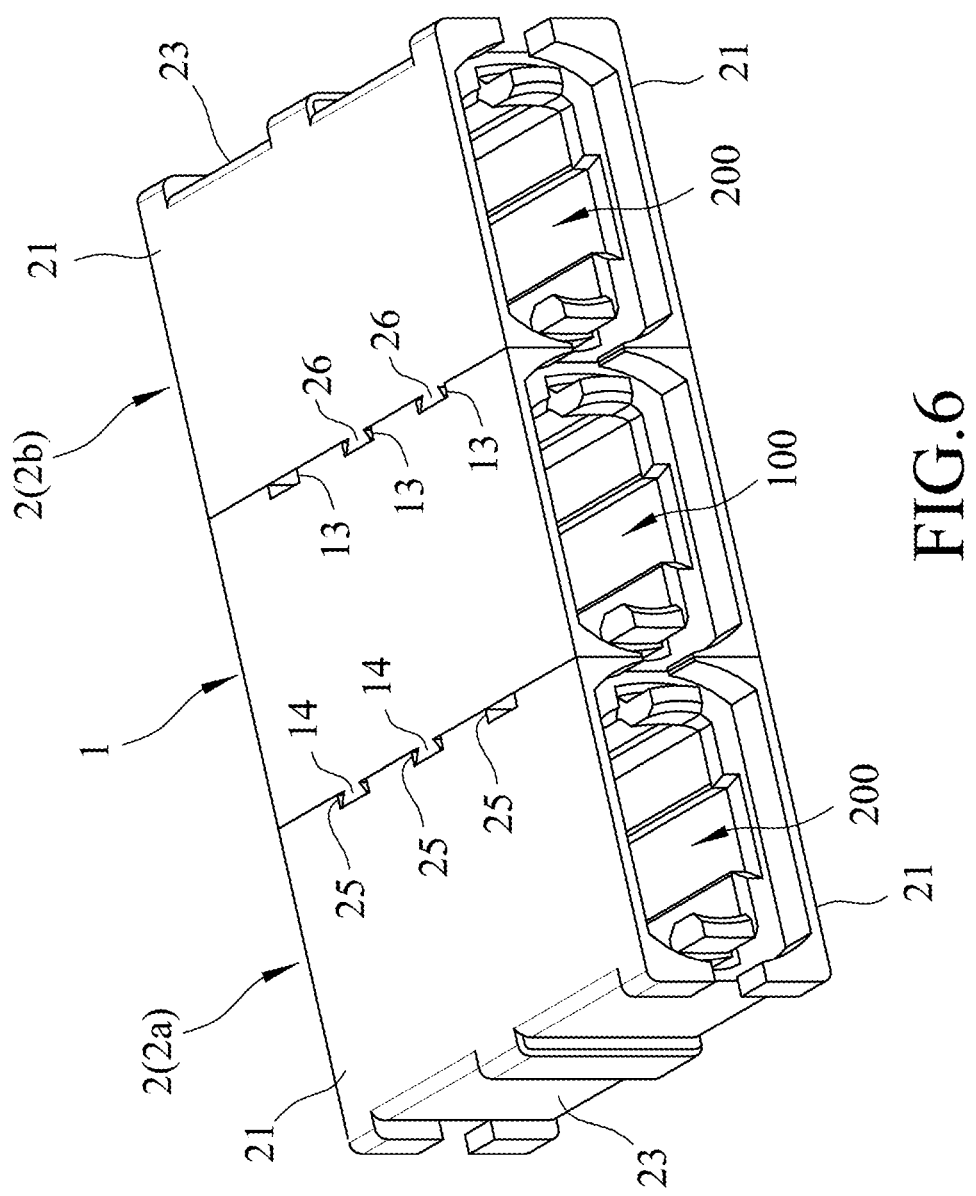
FIG. 6 is a perspective view of a second embodiment of the disclosure including a main body and two end bodies.
Figure 7:
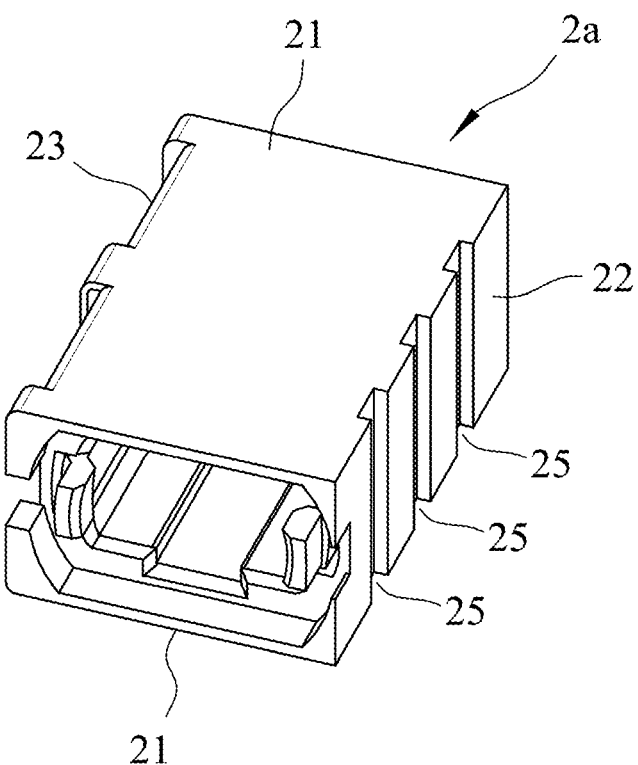
FIG. 7 is a perspective view illustrating one of the end bodies of the second embodiment.

Referring to FIGS. 6 and 7, a second embodiment of the fiber optic adaptor assembly is similar to that of the first embodiment, further including two end bodies 2a, 2b adapted to be coupled to the main body 1. Each of the end bodies 2a, 2b includes two parallel and spaced-apart end base wall 21, a coupling wall 22 and a side wall 23 each of which is connected between the end base walls 21. The end base walls 21 cooperate with the coupling wall 22 and the side wall 23 to define an installation hole 200 thereamong.

Figure 8:
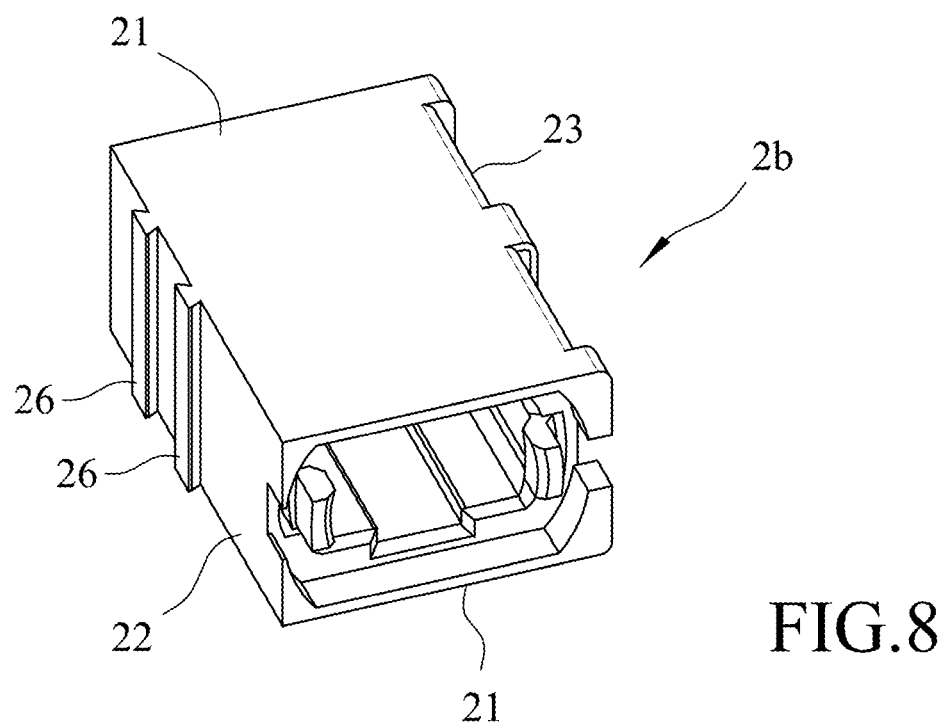
FIG. 8 is a perspective view illustrating the other one of the end bodies of the second embodiment.

Referring back to FIG. 7, one of the end bodies 2a includes three spaced-apart coupling grooves 25 that are formed in the coupling wall 22. Any two adjacent ones of the coupling grooves 25 are configured to be able to be respectively and removably coupled to the connecting tongues 14 of the main body 1. Referring to FIG. 8, the other one of the end bodies 2b includes two spaced-apart coupling tongues 26 that protrude from the coupling wall 22 for respectively engaging any two adjacent ones of the connecting grooves 13 of the main body 1. In this embodiment, each of the coupling grooves 25 and the coupling tongues 26 is elongated to extend from one of the end base walls 21 to the other one of the base walls 21, but is not restricted to such. The end bodies 2a, 2b serves to give the fiber optic adaptor assembly smooth ends without the presence of either the coupling groove 25 or the coupling tongue 26 on the side wall 23 of each of the end bodies 2a, 2b. The end bodies 2b or the main body 1 of the second embodiment may also includes two configurations which are different from each other in the locations of the coupling tongues 26 (with reference of the description of the two configurations of the main bodies 1a, 1b of the first embodiment).

Figure 9:
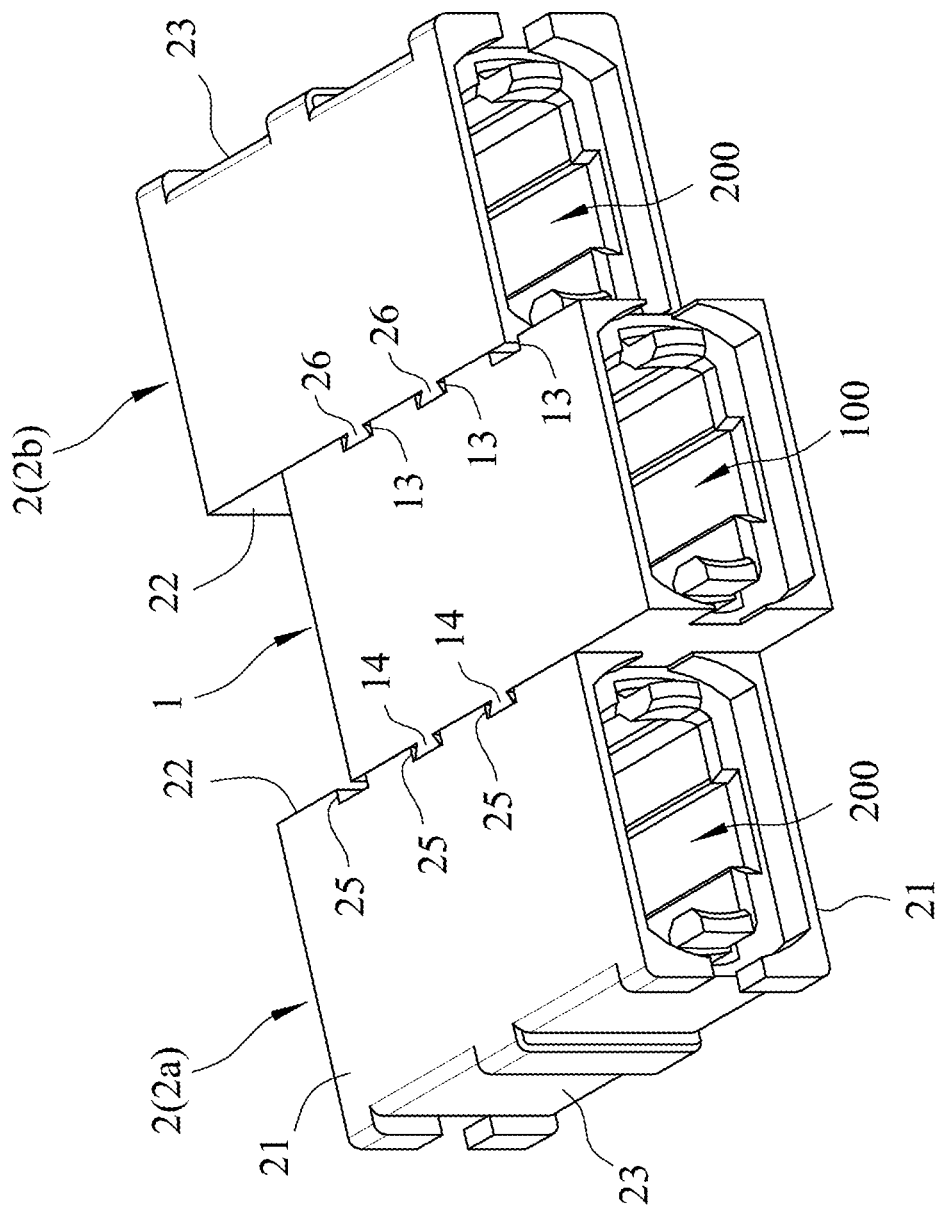
FIG. 9 is a view similar to FIG. 6, illustrating the an assembly of the main body and the end bodies of the second embodiment being peripherally misaligned.

Referring to FIGS. 6 and 9, the ways in which the end bodies 2a, 2b become coupled to the main body 1 is similar to that among the main bodies 1a, 1b of the first embodiment. To be peripherally aligned (as shown in FIG. 6), the inner one of the connecting tongues 14 of the main body 1 engages a middle one of the coupling grooves 25 of the end body 2a, and the middle one of the connecting grooves 13 of the main body 1 is engaged to an inner one of the coupling tongues 26 of the end body 2b. In addition, the outer one of the connecting tongues 14 engages either one of the remaining coupling grooves 25 of the end body 2a, and either one of the connecting grooves 13 of the main body 1 is engaged to an outer one of the coupling tongues 26 of the end body 2b.

When only the main body 1 is to be peripherally misaligned (as shown in FIG. 9), the outer one of the connecting tongues 14 of the main body 1 engages the middle one of the coupling grooves 25 of the end body 2a, and the inner one of the connecting tongue 14 of the main body 1 engages one of the remaining coupling grooves 25 of the end body 2a. Likewise, the middle one of the connecting grooves 13 of the main body 1 is engaged to the outer one of the coupling tongues 26 of the end body 2b, and one of the remaining connecting grooves 13 of the main body 1 proximate to the outer one of the connecting tongues 14 of the main body 1 is engaged to the inner one of the coupling tongues 26 of the end body 2b, such that both of the end bodies 2a, 2b remain aligned With each other. It should be noted that the main body 1 and the end bodies 2a, 2b of the fiber optic adaptor assembly may be further realigned in other combinations of patterns and is not restricted to the abovementioned examples.

Overall, the fiber optic adaptor assembly, via the coupling design of at least one main body 1 and the end bodies 2, is flexible to be assembled to fit through different types of distribution hubs without the need of dedicated molding during manufacturing.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:
1. A fiber optic adaptor assembly comprising:
a main body including
two parallel and spaced-apart main base walls,
two lateral walls, each of which is connected between said main base walls, said main base walls and said lateral walls cooperatively defining an installation hole thereamong, three spaced-apart connecting grooves that are formed in one of said lateral walls, and
two spaced-apart connecting tongues that protrude from the other one of said lateral walls;
wherein, said connecting tongues are adapted to separably and respectively engage any two adjacent ones of said connecting grooves of another one of said main body, a distance between said connecting tongues being the same as a distance between every adjacent pair of said connecting grooves.

2. The fiber optic adaptor assembly as claimed in claim 1, further comprising:
an end body including
two parallel and spaced-apart end base wall,
a coupling wall and a side wall, each of which is connected between said end base walls, said end base walls cooperating with said coupling wall and said side wall to define an installation hole thereamong, and
three spaced-apart coupling grooves that are formed in said coupling wall, any two adjacent ones of which being able to be respectively and removably coupled to said connecting tongues of said main body.

3. The fiber optic adaptor assembly as claimed in claim 1, further comprising:
an end body including
two parallel and spaced-apart end base wall,
a coupling wall and a side wall, each of which is connected between said end base walls, said end base walls cooperating with said coupling wall and said side wall to define an installation hole thereamong, and
two spaced-apart coupling tongues that protrude from said coupling wall for respectively and removably engaging any two adjacent ones of said connecting grooves of said main body.

* * * * *